Dec. 17, 1946.                A. FROSCH                  2,412,575
                              WELL LOGGING
              Filed July 26, 1941          3 Sheets-Sheet 3

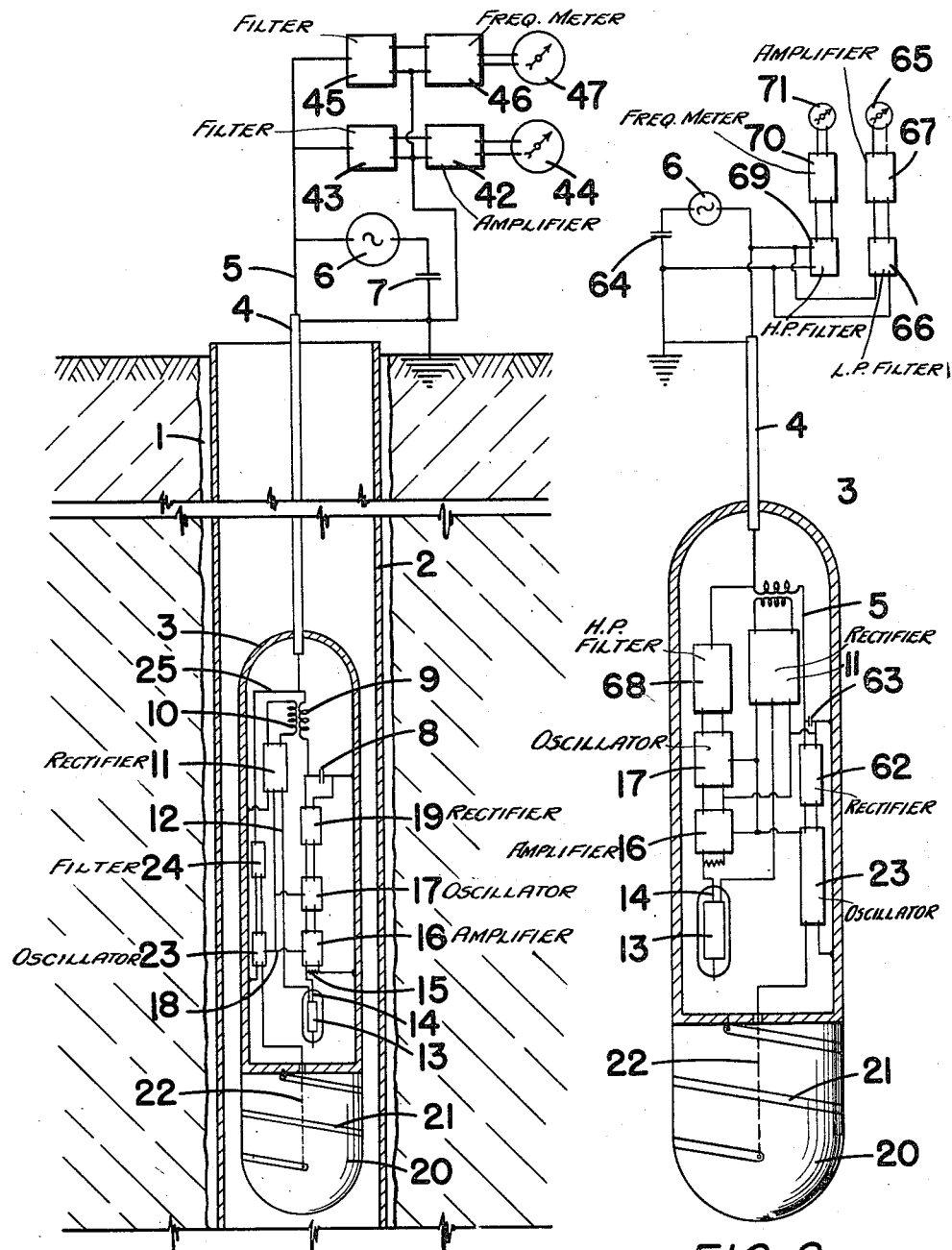

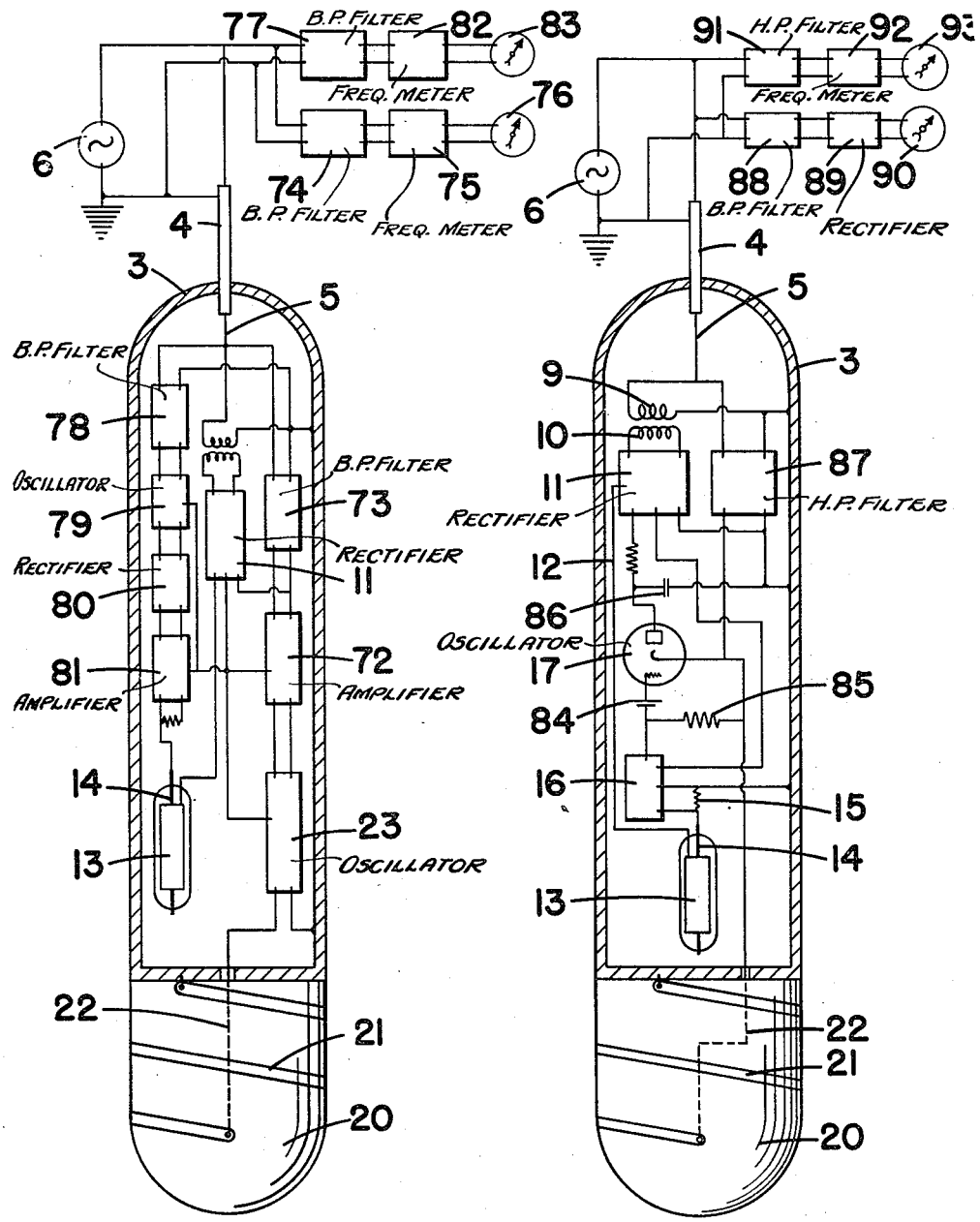

Alex Frosch   INVENTOR.
                              BY    P. J. Whelan
                                              ATTORNEY

UNITED STATES PATENT OFFICE 2,412,575

WELL LOGGING

Alex Frosch, Houston, Tex., assignor to Standard Oil Development Company, a corporation of Delaware Application July 26, 1941, Serial No. 404,114

4 Claims. (Cl. 250—83.6)

The present invention is directed to well-logging and resides particularly in a method and apparatus for making a plurality of measurements in a borehole simultaneously.

Various types of well-logging operations are well known in the art. For example, it is known to measure the apparent resistance or impedance of the formations traversed by a borehole. Likewise, it is known to measure the natural potential of the formations so traversed. Similarly, methods have been proposed by measuring the gamma-ray intensity along a borehole resulting from radioactive emanations from the formations traversed. The measurement of temperature along a borehole has been suggested as a logging method. Logging by the measurement of acoustic properties of the formations traversed has also been suggested.

Insofar as electrical logging is concerned, it has been found that the measurement of electrical resistance or impedance alone does not give sufficient information even for correlation purposes, with the result that, in practice, an effort is always made to obtain a potential as well as a resistance or impedance log. Methods and apparatus for making these measurements simultaneously already have been proposed.

It has been discovered that a gamma-ray log corresponds in general to a natural earth potential log. A temperature log, on the other hand, follows the same general pattern as an earth resistance log. A combination of gamma-ray and temperature logs affords a basis for correlation purposes comparable to that afforded by a combination of earth resistance and natural earth potential logs and can be made in a cased well.

It is one of the objects of this invention to provide a method and apparatus for simultaneously making a gamma-ray log and a temperature log.

An additional object of the present invention is the provision of a method and apparatus by the utilization of which it is possible to make simultaneously in a borehole measurements of values which manifest themselves as changes in resistance or voltage in an electrical circuit in any desired number. For example, it is possible according to the present invention to make in a borehole simultaneously a measurement of natural earth potential and impedance or resistance measurements with as many electrode spreads as desired while utilizing a single conductor cable.

A more specific object of the present invention is the provision of a method and apparatus for making borehole measurements in which the quantity to be measured is used to control the frequency of an oscillator, the output of which is transmitted to the surface through a conductor, which also carries power from the surface to the oscillator.

Further objects and advantages of the present invention will appear from the following detailed description of the accompanying drawings in which—

Fig. 1 is a front elevation in diagrammatic form of one embodiment of the present invention in position in a borehole;

Fig. 2 is a similar view of the second embodiment of the present invention;

Fig. 3 is a similar view of the third embodiment of the present invention;

Fig. 4 is still another modification of the present invention;

Figure 6:
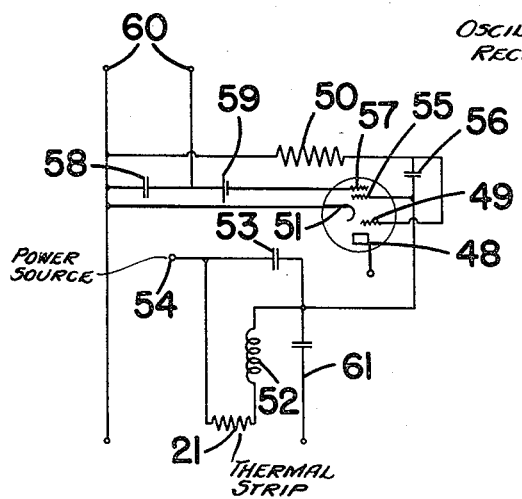
Figure 7:
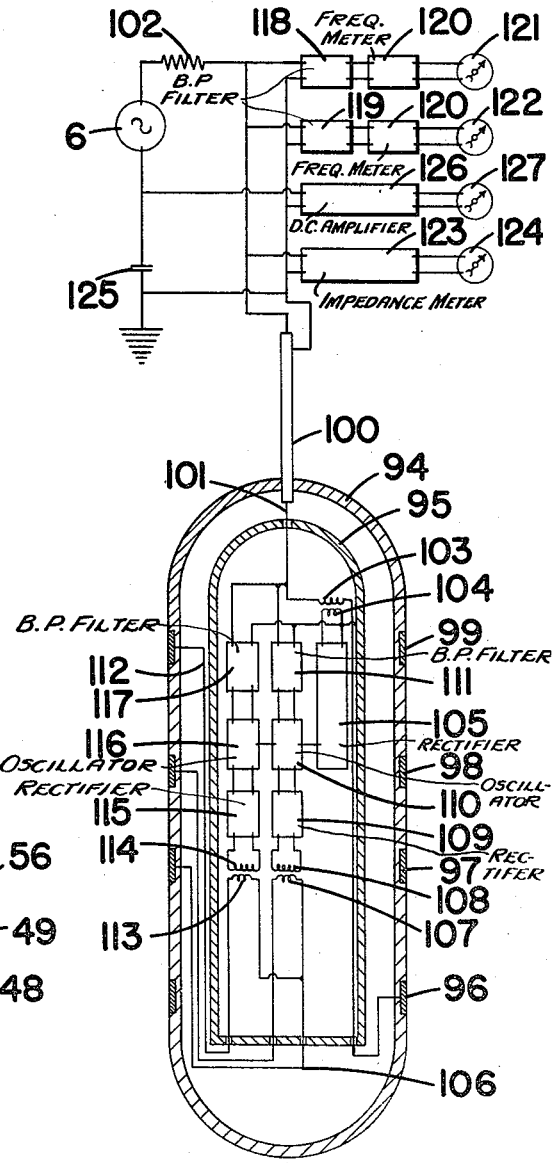

Fig. 6 is a sinusoidal oscillator frequency modulated by a rectified A. C. or D. C. signal or directly by an A. C. signal; and Fig. 7 is a view similar to Fig. 1 of still another embodiment of the present invention.

Referring to the drawings in detail, and specifically to Fig. 1, numeral 1 represents a borehole lined with a metallic casing 2. It will be understood, of course, that the method of the present invention is applicable to cased and uncased holes. Numeral 3 designates a bomb made of metal of sufficient thickness and strength to withstand the pressures encountered at great depths in boreholes. The bomb is suspended on a cable 4 carrying an insulated single conductor 5 enclosed in a metallic sheath. At the surface the conductor is connected to the output of an alternating current generator 6 which is grounded through a condenser 7.

The cable is connected to the bomb 3 in such a manner as to provide a fluid tight joint in the manner well known and the conductor 5 extends into the bomb 3 where it is grounded through a condenser 8. Arranged ahead of the condenser 8 in the conductor 5 is the primary 9 of a transformer, the high voltage secondary 10 of which has its terminals connected to the input terminals of a rectifier 11. Additional low voltage secondaries not shown are provided for supplying the heaters of all tubes in the conventional manner. The rectifier 11 will ordinarily be a diode rectifier of well known design.

The output voltage of the rectifier may be divided by the use of a suitable potential divider in conjunction with the usual low pass filters. One portion of this voltage is supplied by lead 12 to the cathode 13 of a Geiger-Müller counter, the anode 14 of which is grounded through a resistance 15 in the usual manner. The anode 14 is connected to the input of a vacuum tube amplifier 16 of conventional design, the output of which is fed to a trigger oscillator 17, which may be a thyratron tube. A second tap 18 from the rectifier 11 supplies the plate voltage for the amplifier and the trigger oscillator.

The output of the trigger oscillator is fed to a rectifier 19, which, in turn, delivers its output to condenser 8. Affixed to the lower end of the bomb 3 is a plug 20 of insulating material, such as Bakelite. This plug is provided with a circumferential groove to receive a flat strip of conducting material 21. This strip of conducting material will be so selected as to have a resistance low in comparison to that of the fluid in the borehole and also a low heat capacity, and preferably a high thermal coefficient of resistance.

One end of the strip 21 is grounded to the metal casing and the other end is connected by conductor 22, which passes through a fluid tight opening in the bottom of casing 3, to an oscillator 23. This oscillator may be either a trigger type pulse oscillator or a sinusoidal oscillator or a pulse oscillator controlled by a sinusoidal oscillator. The temperature responsive element 21 is connected in the circuit of this oscillator in such a way as to control the frequency of the output of the oscillator in a manner which will be described in more detail in connection with Figs. 5 and 6.

The output of the oscillator is delivered to a filter 24 of conventional design which is selected so as to pass high frequencies. It may be pointed out that the filter and the oscillator may be so selected as to deliver any desired frequency, depending upon the frequency of the power current delivered by conductor 5. That is to say, if the power frequency delivered by conductor 5 is sixty cycles per second it will be preferable to select an oscillator which will have a frequency output of 1,000 cycles or higher. If such a pulse oscillator is used, the pulse rate of its output can be below the power frequency as well as above it. In general it may be stated the higher the normal frequency output of the oscillator 23, the more sensitive will it be to temperature changes as reflected in the resistance of the element 21. The output of the filter is delivered to the conductor 5 above the primary winding 9 by a conductor 25.

Figure 5:
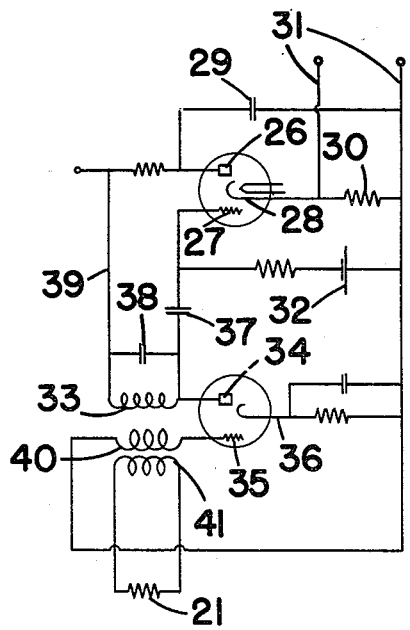
Fig. 5 is a wiring diagram of an oscillator, frequency-modulated directly by an A. C. signal.

In Fig. 5 is shown a suitable oscillator for use in the embodiment shown in Fig. 1. In essence this oscillator is a vacuum tube having a plate 26, a grid 27 and a cathode 28, as well as a filament, not shown. This vacuum tube is of the type in which the grid voltage upon obtaining a certain value fires the tube and creates a pulse of current in the circuit including the plate and the cathode. To this end there is arranged between the plate and the cathode a condenser 29 in series with a resistance 30. The output leads 31 are connected on each end of the resistance 30. When the grid voltage exceeds a predetermined value the tube is fired and the condenser 29, having been charged by the plate voltage discharges through the resistance 30. The voltage resulting across resistance 30 is used to transmit pulses through leads 31.

In this case the voltage at which the grid will fire the tube is adjusted by a biasing battery 32. In the use of this type of oscillator in the apparatus of the present invention, the battery 32 is omitted and replaced by a tap off from the rectifier 11 in Fig. 1 which will ordinarily contain a voltage divider as a component and integral part thereof. Likewise, the plate voltage is supplied by a tap off 18 from rectifier 11 of Fig. 1.

The rectifier 11 in Fig. 1 also supplies the voltage necessary to operate the oscillator connected to the grid of the tube. This is a conventional sinusoidal oscillating circuit composed essentially of a tube and coils in which a change in the resistance across one of the coils changes the frequency of the oscillator output. In this case the coil 33 is connected to the plate 34 of the tube which also has a grid 35 and a cathode 36. The coil 33 is also connected through a condenser 37 to the grid 27. Across the coil 33 is arranged a condenser 38 in the known manner. The necessary voltage is supplied to the coil by a lead 39 connected through a suitable tap off to the rectifier 11.

In this particular embodiment there is connected between the grid and the cathode a second coil 40 in inductive relation with the coil 33. Likewise, there is arranged a third coil 41 in inductive relation with coils 33 and 40 which is connected across the temperature responsive element 21.

In the normal operation of this oscillator for every cycle of sinusoidal current developed by the oscillator circuit, there would be a firing of the circuit of plate 26. The effect of resistance 21 on the mutual inductance between the coils 33 and 40 and 41 will vary the frequency of the sinusoidal current delivered to the grid 27, and will therefore vary the frequency with which the circuit of plate 26 is fired. Thus, the pulses delivered by the plate circuit will be a function of the temperature to which responsive elements 21 is subjected.

It will be observed that the oscillator shown in Fig. 5 is in reality a pulse-type oscillator actuated by a sinusoidal oscillator. It will be understood that instead of the combination oscillator the sinusoidal oscillator can be used alone by connecting the lead 31 to the output of condenser 37 and omitting the thyratron tube.

Referring back to Fig. 1, conductor 5 is connected at the surface to a D. C. amplifier 42 through a low pass filter 43. Filter 43 is merely an electrical element which offers sufficiently high resistance to high frequencies to block them out. The output of the D. C. amplifier is delivered to a recording meter 44. It will be understood that this meter is of the type in which a movable mirror, the movement of which is controlled by the output of the D. C. amplifier, reflects a beam of light on a moving strip of sensitized paper. As is customary in well-logging apparatus, the cable 4 passes over a measuring sheave at the surface, and this sheave, through suitable connections, drives the winding reel of the camera in which the sensitized paper is carried. Thus, the sensitized paper moves in synchronism with the bomb, and, on the record produced, the measurements are automatically correlated with depth.

Conductor 5 is also connected to the input of a high pass filter 45 which delivers its output to a frequency meter 46. The frequency meter actuates a recording device 47 of a character similar to meter 44. Both the frequency meter and the D. C. amplifier are grounded below condenser 7. It will be observed that the rectifier 19 sets up a potential difference across condenser 8 which is also set up across condenser 7, and the D. C. amplifier amplifies the potential difference across the condenser 7.

It has already been explained that the oscillator 23 can be either the pulse type or the sinusoidal type or both together as shown in Fig. 5. Another sinusoidal type is illustrated schematically in Fig. 6. This type has a tube with a plate and cathode and three grids. The plate 48 is supplied with direct current power when used in the embodiment shown in Fig. 1 by a tap off on the rectifier 11. One of the grids 49 is connected to ground through a resistance 50. Cathode 51 is also connected to ground. The tank circuit composed of coil 52 and condenser 53 in parallel has one of its terminals connected to a source of power 54, in this case a tap off from rectifier 11, and the other of its terminals connected to one of the grids 55. There is a condenser 56 arranged between grid 55 and grid 49. A third grid 57 is connected to ground through a condenser 58 and is provided with a biasing battery 59.

Unlike other oscillators, the plate voltage in this oscillator is lower than the middle grid voltage. The plate voltage is maintained constant. With a constant voltage across condenser 58 the oscillator will put out a constant frequency. A change in the voltage across 58 will vary the frequency of the oscillator. Likewise, a change in the resistance of the tank circuit will change the frequency of the output. Thus, when the oscillator is used to reflect changes in voltage as a measure of a certain property, the significant voltage is impressed across the condenser 58 by being applied to terminals 60. Where, as in the case of the embodiment shown in Fig. 1, the element used to regulate the frequency of the oscillator output is in the form of the resistance 21, this resistance is connected to the tank circuit in series with coil 33. In Fig. 6, resistance 21 of the apparatus shown in Fig. 1 is connected in series with coil 52. When this oscillator is utilized in the embodiment shown in Fig. 1, its output line 61 is connected to the high pass filter 24 shown in Fig. 1. This high pass filter serves to exclude the power frequency from the oscillator 23. If resistance control is used then the terminals 60 are shorted out. If voltage control is used the resistance 21 may be shorted out.

It will be understood that in practice, as is usual in well-logging, the two recording meters 44 and 47 are so arranged as to operate on the same strip of sensitized paper whereby a chart is produced having two spaced irregular lines one showing the variations in temperature with depth and the other showing the variations in gamma-ray intensity with depth, there being a temperature measurement and a gamma-ray intensity measurement for each depth. This combination log is of unusual interest because it corresponds approximately with a log of a combination of natural earth potential and resistance or impedance, which latter logs cannot be obtained in cased holes. Thus, the present invention extends to cased holes the field of logging formerly restricted to uncased holes.

In Fig. 2 parts corresponding to parts in Fig. 1 bear the same numerals. In this embodiment it will be observed that the temperature measurement is recorded as a D. C. signal while the gamma-ray intensity is recorded as a function of a frequency change. In this case the oscillator 23 delivers its output to a rectifier 62 which generates a direct current voltage which is impressed across a condenser 63 arranged in conductor 5. A similar potential is thus impressed across a condenser 64 at the surface and this potential is measured by a meter 65 after passing through a low pass filter 66 and a D. C. amplifier 67.

The output of the oscillator 17, on the other hand, is delivered to a high pass filter 68 and thence to conductor 5, which carries to a corresponding high pass filter 69 at the surface. The output of this latter filter is delivered to a frequency meter 70 which operates a meter 71. It is, of course, apparent that meters 65 and 71 correspond to meters 44 and 47 of Fig. 1. In this embodiment, as in embodiment 1, either pulse type or sinusoidal oscillators may be employed.

Another variation of applicant's invention is shown in Fig. 3. In this embodiment both measurements are recorded as variations in frequency. This necessitates the use of selected frequency bands for the respective measurements and the use of band pass filters. While it is possible to use the pulse type oscillators in this embodiment, it is preferred to use the sinusoidal type of oscillator shown in Fig. 6. Referring specifically to Fig. 3, the output of oscillator 23 is delivered to an A. C. amplifier 72 which, in turn, is connected to a band pass filter 73 the output of which is delivered to conductor 5. Connected to conductor 5 at the surface is a band pass filter 74 of the same frequency range as filter 73 which will pass the signals passed by filter 73 and conduct them to a frequency meter 75 which operates a recording meter 76.

Similarly, there is connected to conductor 5 at the surface a second band pass filter 77 which will pass the same range of frequencies as a band pass filter 78 which receives the output of an oscillator 79 supplied by a rectifier 80, which is connected to an amplifier 81 which receives the pulses from the Geiger-Muller counter. While this amplifier is indicated by a single square, it is to be understood that in practise, as shown in Fig. 1, there will be a levelling device, such as a thyratron tube between the amplifier and the rectifier.

The output of band pass filter 77 is delivered to a frequency meter 82 which operates a recording meter 83.

It will be observed that there are two signals of different frequency ranges transmitted upwardly through conductor 5 while the A. C. power is transmitted downwardly. Since the A. C. power will ordinarily be 60 cycles there is a wide variety of frequency ranges which can be used for the respective signals. Naturally, it is desirable to have a considerable gap between the maximum of the lower frequency range and the minimum of the higher frequency range. To illustrate, the band pass filter 73 may be designed to pass frequencies from 1000 to 2000 cycles, while the band pass filter 78 may be designed to pass frequencies from 3000 to 4000 cycles, the oscillators 23 and 79 being accordingly operated. It will be apparent that the gap between these two frequency ranges can be considerably greater.

It will be understood that in the embodiment shown in Fig. 3 the rectifier and oscillator in the Geiger-Muller counter channel can be omitted if desired. In this case the band pass filter may be replaced by a high pass filter or retained. If the high pass filter is used, the amplified Geiger-Muller counter pulses will be transmitted directly to the conductor 5. Ordinarily the frequency of these pulses will be very different from the frequency of the oscillations generated by oscillator 73. In some cases it may be necessary to adjust the frequency of the charging current so as to insure that it will be considerably different from the frequency of the pulses of the Geiger-Muller counter.

In Fig. 4 is shown an embodiment of the invention, insofar as it is directed broadly to the simultaneous production of gamma-ray log and a temperature log, in which a carrier wave is employed and its amplitude modulated by one measurement and its frequency modulated by the other measurement. In this case the bomb 3, as in the case of the previous embodiments, includes the Geiger-Muller counter, the operating voltage of which is supplied by the rectifier 11 connected to the secondary 10, which is inductively connected to the primary 9 arranged in conductor 5. Likewise, the output of the Geiger-Muller counter is delivered to the amplifier 16, which operates the trigger oscillator 17. As is well known, the trigger oscillator is of the type which has a cutoff bias on the grid obtained by the use of a biasing battery which is indicated in Fig. 4 by numeral 84. Numeral 85 indicates the conventional grid leak.

The temperature responsive element 21 is connected to the cathode of the trigger tube. Between the plate of the tube and the ground is a condenser 86. Thus, when the tube fires, the condenser 86 having been charged previously discharges through the tube and the temperature responsive element 21, one terminal of the temperature responsive element being connected to the ground so as to complete the circuit. The pulse so generated in this circuit is conducted to filter 87, which is a high pass filter through which the charging current from alternator 6 cannot pass. The output of the filter 87 is delivered to conductor 5 above the primary winding 9.

As is well understood, the output of the trigger tube is in the form of pulses which with a constant voltage supply from the rectifier will ordinarily be of substantially constant amplitude. By reason of the connection of the temperature responsive element to the plate-cathode circuit, changes in the resistance of the temperature responsive element will vary the wave form of the pulses without varying their amplitude appreciably. That is, the width or time constant of the pulses will increase the resistance. Accordingly, in the practice of the present invention with this embodiment, it is desirable to record a value which is a function of the wave form of the pulses as well as to record the frequency of the pulses.

Arranged at the surface and electrically connected to conductor 5 is a filter 88. This filter is preferably a band pass filter having a characteristic such that the principal frequency of the pulses will fall on a sloping portion of the characteristics of the filter. This principal frequency can readily be adjusted by suitable selection of the resistance of element 21 and the capacity of condenser 86. When such a filter is used, its output voltage will be a function of the time constant of the pulses delivered to it. The output of the filter 88 is delivered to a rectifier 89, the output of which operates a recording voltmeter 90.

Also connected to conductor 5 in parallel with filter 88 is a high pass filter 91, used to prevent the supply current affecting the measurements, the output of which is delivered to a frequency meter 92 which, in turn, operates a recording milliameter 93. On the resulting record the trace produced by meter 90 will be a function of the temperature changes in the borehole while the trace recorded by meter 93 will be a function of the variation in gamma-ray intensity along the borehole.

In the foregoing description devices have been described which include means for making a gamma-ray measurement. As has been previously pointed out, the present invention, insofar as it relates to the transmission of signals from a borehole to the surface, is applicable to all types of borehole measurements. An embodiment of the invention in which only electrical measurements are made is shown in Fig. 7.

Referring to Fig. 7 in detail, numeral 94 designates an electrode which will ordinarily be an elongated weighted body covered with insulating material such as Bakelite or rubber. This electrode is provided with an interior chamber 95 for accommodation of the electrical equipment employed. Arranged in circumferential grooves on the surface of the electrode are a plurality of conductive rings 96, 97, 98, and 99. Ring 96 is the supply ring through which a charging current is supplied to the formation surrounding the borehole. The other rings pick up the potential along the borehole due to the charging current.

The electrode 94 is suspended on a cable 100 carrying a single conductor 101 which is connected at the surface to an alternator 6 through a device such as a sufficiently large resistance 102, for maintaining a constant current in the charging circuit. In the electrode, the conductor 5 is connected to the supply ring 96. In chamber 95 there is arranged in conductor 101 the primary 103 of a transformer, secondary 104 of which supplies a rectifier 105, the divided output of which is used to supply direct current voltage to the various electrical appliances requiring it. A conductor 106 connects rings 97 and 98. Inside chamber 95 there is arranged in conductor 106 the primary 107 of a transformer, the secondary 108 of which delivers an alternating voltage to the rectifier 109 of the vacuum tube type. The output of the rectifier is delivered to an oscillator 110, which is preferably of the sinusoidal type shown in Fig. 6. In this case the rectifier output terminals are connected to terminals 60 and, of course, the resistance 21 may be omitted. If a pulse type oscillator is used, the rectifier output is applied to its grid circuit in series with its grid bias and grid leak (see line containing battery 32 in Fig. 5). The output of the oscillator is delivered to a band pass filter 111, which has its output connected to conductor 101.

A conductor 112 connects ring 99 with conductor 106. In chamber 95 there is arranged in conductor 112 the primary 113 of a transformer the secondary 114 of which supplies alternating voltage to a rectifier 115, which is also the vacuum tube type and which controls an oscillator 116 of the same type as oscillator 110. The output of this oscillator passes through a band pass filter 117 which is connected also to conductor 101.

As in previous embodiments the band pass filters will have different ratings such that each will pass a band of frequencies quite different from the band of frequencies passed by the others, and both quite different from the frequency of the supplied current.

At the surface there are connected to conductor 101 two band pass filters, the one 118 being capable of passing the same band of frequencies as filter 117, and the other 119, being capable of passing the same band of frequencies as filter 111. Each filter delivers its output to a frequency meter 120, which in turn operates recording milliammeters 121 and 122 respectively. Meter 121 records the variations in voltage between rings 97 and 99 while meter 122 will record the variation in voltage between rings 97 and 98.

Also connected in parallel with these meters to conductor 101 is an impedance meter 123 of the type shown in U. S. Patent 2,222,182, which is used to operate a third recording milliammeter 124 which records the variations in impedance of the earth along the borehole.

Between alternator and the ground is a condenser 125 across which is connected a D. C. amplifier 126 which operates a recording meter 127. This latter meter records the variations in natural earth potential along the borehole.

As has previously been explained, these recording meters will be arranged so as to cast beams of light on a moving strip of sensitized paper which, by a suitable connection with the sheave over which the cable passes into the borehole, travels in synchronism with the electrode, whereby the various measurements are automatically correlated with depth. While only two channels have been shown in this embodiment it will be manifest that as many channels as desired may be employed whereby any number of spaced electrodes may be employed. It will also be apparent from what has been said heretofore that channels can be supplied for making gamma-ray intensity measurements and for making temperature measurements along with the various measurements described in connection with Fig. 7, all with the use of a single conductor cable. The combination of a gamma-ray measuring channel with a channel for measuring impedance or natural earth potential is particularly desirable, because the latter channel makes possible an indication of the location of the bottom of the casing when a gamma-ray log is made in a cased hole.

In the foregoing description various modifications of the present invention have been described, with no intention, however, of limiting the invention to these particular modifications. The invention resides broadly in a method and apparatus for making a plurality of measurements in a borehole simultaneously while using a single conductor cable, and, more specifically, in the production of a log on which variations in gamma-ray intensity and temperature are recorded simultaneously with depth, particularly in a cased hole.

The nature and objects of the present invention having been thus described and illustrated, what is claimed as new and useful and is desired to be secured by Letters Patent is:

1. An apparatus for simultaneously measuring along a borehole two physical properties of formations traversed thereby comprising a bomb adapted to be lowered in said borehole, a cable for suspending said bomb carrying an electrical conductor, a generator of a carrier wave arranged in said bomb having its output connected to said conductor, means adapted to be disposed at the surface and connected to said conductor for recording the output of said generator, means carried by said bomb responsive to one of the physical properties to be measured and connected to said generator to control the frequency of its carrier wave, and separate means carried by said bomb and responsive to the other physical property to be measured and connected to said generator to control the amplitude of its carrier wave.

2. An apparatus according to claim 1 in which one of said responsive elements in said bomb responds to gamma-ray activity and the other of said responsive elements responds to temperature.

3. A method for simultaneously measuring in a borehole two physical properties of a formation traversed thereby, which comprises, generating in said borehole adjacent said formation a pair of signals, each of which is a function of a different one of the properties to be measured, generating in said borehole an oscillating carrier wave, modifying the frequency of said carrier wave by one of said signals, modifying the amplitude of said carrier wave by the other of said signals, transmitting the modified carrier wave to the surface, and there recording values indicative of said signals.

4. A method according to claim 3 in which the values measured are the temperature and the gamma-ray activity.

ALEX FROSCH.